(12) United States Patent
Takahashi et al.

(10) Patent No.: US 10,461,588 B2
(45) Date of Patent: Oct. 29, 2019

(54) SLOT COIL AND STATOR FOR ELECTRIC ROTARY MACHINE

(71) Applicant: HONDA MOTOR CO., LTD., Tokyo (JP)

(72) Inventors: Tadanobu Takahashi, Saitama (JP); Kengo Ohira, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 15/836,232

(22) Filed: Dec. 8, 2017

(65) Prior Publication Data

US 2018/0166931 A1 Jun. 14, 2018

(30) Foreign Application Priority Data

Dec. 9, 2016 (JP) ................................. 2016-239787

(51) Int. Cl.
| | |
|---|---|
| *H02K 1/00* | (2006.01) |
| *H02K 3/00* | (2006.01) |
| *H02K 1/04* | (2006.01) |
| *H02K 1/16* | (2006.01) |
| *H02K 3/48* | (2006.01) |
| *H02K 3/12* | (2006.01) |
| *H02K 3/32* | (2006.01) |
| *H02K 3/46* | (2006.01) |
| *H02K 15/00* | (2006.01) |
| *H02K 15/085* | (2006.01) |

(52) U.S. Cl.
CPC ................. *H02K 1/04* (2013.01); *H02K 1/16* (2013.01); *H02K 1/165* (2013.01); *H02K 3/12* (2013.01); *H02K 3/32* (2013.01); *H02K 3/46* (2013.01); *H02K 3/48* (2013.01); *H02K 15/00* (2013.01); *H02K 15/085* (2013.01)

(58) Field of Classification Search
CPC ........ H02K 15/00; H02K 15/085; H02K 1/04; H02K 1/16; H02K 1/165; H02K 3/12; H02K 3/32; H02K 3/46; H02K 3/48
See application file for complete search history.

(56) References Cited

U.S. PATENT DOCUMENTS 2,008,451 A * 7/1935 Jenkins .................... H02K 3/12
310/213
3,484,923 A * 12/1969 Peters .................. H02K 15/085
242/432.6
(Continued)

FOREIGN PATENT DOCUMENTS

| CN | 102457110 A | 5/2012 |
| CN | 103580396 A | 2/2014 |

(Continued)

OTHER PUBLICATIONS

Aug. 1, 2019, Chinese Office Action issued for related CN Application No. 201711170188.4.

*Primary Examiner* — Yuriy Semenenko
(74) *Attorney, Agent, or Firm* — Paratus Law Group, PLLC

(57) ABSTRACT

A slot coil 25 is inserted into a slot 23 provided in a stator core 21 and is covered with an insulating material 28. The insulating material 28 has an ear portion 29 on an outer circumferential surface thereof. The slot coil 25 is fixed to the stator core 21 by the ear portion 29 welded to an end surface 21*b* of the stator core 21.

11 Claims, 18 Drawing Sheets

(56) References Cited

U.S. PATENT DOCUMENTS

| | | | | |
|---|---|---|---|---|
| 3,599,324 | A * | 8/1971 | Peters | H02K 15/085 242/432.6 |
| 6,140,722 | A * | 10/2000 | Ballard | H02K 5/225 310/68 D |
| 9,225,228 | B2 * | 12/2015 | Hasuo | B21D 28/06 |
| 2005/0116571 | A1 * | 6/2005 | Ichikawa | H02K 3/12 310/201 |
| 2011/0012475 | A1 * | 1/2011 | Mera | H02K 3/345 310/215 |
| 2013/0002086 | A1 * | 1/2013 | Kaiser | H02K 1/16 310/216.009 |
| 2013/0020901 | A1 * | 1/2013 | Kishi | H02K 3/12 310/215 |
| 2014/0042865 | A1 | 2/2014 | Mourou et al. | |
| 2015/0280503 | A1 * | 10/2015 | Takahashi | H02K 3/12 310/201 |
| 2016/0149456 | A1 * | 5/2016 | Kitora | H02K 3/50 310/71 |
| 2016/0276887 | A1 | 9/2016 | Watanabe et al. | |
| 2017/0141635 | A1 | 5/2017 | Iki | |

FOREIGN PATENT DOCUMENTS

| | | |
|---|---|---|
| CN | 204794408 U | 11/2015 |
| CN | 105990917 A | 10/2016 |
| CN | 106104977 A | 11/2016 |
| JP | H01-303037 A | 12/1989 |
| JP | H04-138044 A | 5/1992 |
| JP | 2003-047213 A | 2/2003 |
| JP | 2006-180698 A | 7/2006 |
| JP | 2007-288933 A | 11/2007 |
| JP | 2013-027174 A | 2/2013 |
| JP | 2016-158346 A | 9/2016 |

* cited by examiner

SLOT COIL AND STATOR FOR ELECTRIC ROTARY MACHINE

CROSS-REFERENCE TO RELATED APPLICATION (S)

This application claims priority from Japanese Patent Application No. 2016-239787 filed on Dec. 9, 2016, the entire contents of which are incorporated herein by reference.

FIELD

The present invention relates to a stator for an electric rotary machine that can be mounted on an electric vehicle, a hybrid vehicle, or the like, and a slot coil that is inserted into a slot provided in a stator core of the stator.

BACKGROUND

Recently, as a stator for an electric rotary machine, an electric rotary machine using a segmented coil has been proposed. For example, in JP-A-2013-027174, coil loops are formed by connecting slot coils and connection coils to each other, the slot coil being disposed in slots of a stator core, and the connection coils functioning as a crossover portion that is disposed outside of the stator core. In addition, in an electric rotary machine described in JP-A-2013-027174, the slot coil covered with an insulating material is press-fitted into the slot of the stator core.

In general, when a slot coil is attempted to be press-fitted into a slot of a stator core, due to a dimensional error or the like of laminated steel sheets, the insulating material is stuck by a projecting portion formed in an inner circumferential surface of the slot, and the press-fining of the slot coil is interfered. Therefore, it is necessary to increase the press-fitting load. On the other hand, when the press-fitting load increases, a part of the insulating material or an end portion of the steel sheet that projects in the slot is broken during press-fitting, and stays in the slot. This broken portion may become foreign matter during use of the electric rotary machine.

SUMMARY

The present invention is to provide a slot coil and a stator for an electric rotary machine which can achieve excellent assembling properties and suppressing the occurrence of foreign matter.

The invention provides following aspects (1) to (11), (1) A slot coil (e.g. a slot coil 25 in an embodiment) that is inserted into a slot (e.g., a slot 23 in an embodiment) provided in a stator core (e.g., a stator core 21 in an embodiment), wherein the slot coil is covered with an insulating material (e.g., an insulating material 28 in an embodiment), the insulating material has an ear portion (e.g., an ear portion 29 in an embodiment) on an outer circumferential surface thereof, and the slot coil is fixed to the stator core by the ear portion welded to one end surface (e.g., an end surface 21*b* in an embodiment) of the stator core.

(2) The slot coil according to (1), wherein the ear portion has an inner circumferential ear portion (e.g., an inner circumferential ear portion 29A in an embodiment) that is provided on an inner circumferential side of the slot coil and extends to a first side of a circumferential direction, and an outer circumferential ear portion (e.g., an outer circumferential ear portion 29B in an embodiment) that is provided on an outer circumferential side of the slot coil and extends to a second side of the circumferential direction, the second side being opposite to the first side in the circumferential direction.

(3) The slot coil according to (1) or (2), wherein the ear portion has a projecting portion (e.g., a projecting portion 73 in an embodiment) that is fitted to an accommodation portion (e.g., an outer accommodation portion 21*c* and an inner accommodation portion 21*d* in an embodiment) provided in the one end surface of the stator core.

(4) The slot coil according to (3), wherein the projecting portion has a through hole (e.g., a through hole 70 in an embodiment) or a depressed portion into which a welding gun (e.g., a welding gun G in an embodiment) is inserted.

(5) A stator (e.g., a stator 10 in an embodiment to be described below) for an electric rotary machine including:

a stator core (e.g., the stator core 21 in an embodiment) that includes a plurality of slots (e.g., the slots 23 in an embodiment); and a coil (e.g., a coil 50 in an embodiment) that is attached to the stator core, wherein the coil includes a plurality of slot coils (e.g., the slot coils 25 in an embodiment) that are inserted into the slots, and a plurality of connection coils (e.g., the connection coils 40 in an embodiment) through which the slot coils are connected to each other on an outside side of an end surface of the stator core in an axial direction.

each of the slot coils and each of the connection coils are connected to each other at a contact portion (e.g., contact surfaces P2 and P3 in an embodiment), the slot coil is covered with an insulating material (e.g., the insulating material 28 in an embodiment), the insulating material has an ear portion (e.g., the ear portion 29 in an embodiment) on an outer circumferential surface thereof, and the slot coil is fixed to the stator core by the ear portion welded to one end surface (e.g., the end surface 21*b* in an embodiment) of the stator core.

(6) The stator for an electric rotary machine according to (5), wherein the ear portion has an inner circumferential ear portion (e.g., the inner circumferential ear portion 29A in an embodiment) that is provided on an inner circumferential side of the slot coil and extends to a first side of a circumferential direction, and an outer circumferential ear portion (e.g., the outer circumferential ear portion 29B in an embodiment) that is provided on an outer circumferential side of the slot coil and extends to a second side of the circumferential direction, the second side being opposite to the first side in the circumferential direction.

(7) The stator for an electric rotary machine according to (6), wherein in slot coils inserted into the slots adjacent to each other in the circumferential direction, the outer circumferential ear portion of one slot coil overlaps with the inner circumferential ear portion of another slot coil in the circumferential direction.

(8) The stator for an electric rotary machine according to any one of (5) to (7), wherein the ear portion has a projecting portion (e.g., the projecting portion 73 in an embodiment) that is fitted to an accommodation portion (e.g., the outer accommodation portion 21c and the inner accommodation portion 21d in an embodiment) provided in the one end surface of the stator core.

(9) The stator for an electric rotary machine according to (8), wherein the projecting portion has a through hole (e.g., the through hole 70 in an embodiment) or a depressed portion into which a welding gun (e.g., the welding gun G in an embodiment) is inserted.

(10) A method of manufacturing the stator for an electric rotary machine according to any one of (5) to (9), the method including:

a slot coil disposing step of inserting the slot coil into the slot of the stator core; and a welding step of welding the ear portion of the insulating material to one end surface of the stator core.

(11) The method of manufacturing the stator for an electric rotary machine according to (10), wherein the welding step includes cooling the ear portion by blowing compressed air after melting the ear portion.

According to aspect (1), the insulating material that covers the slot coil has the ear portion on the outer circumferential surface thereof, and the ear portion is welded to the one end surface of the stator core. As a result, the slot coil can be easily fixed to the stator core. In addition, since the slot coil is not press-fitted, a part of the insulating material or an end portion of the steel sheet that projects in the slot is not broken during press-fitting, and does not stay in the slot. Therefore, the broken portion can be prevented from becoming foreign matter during use of the electric rotary machine.

According to aspect (2), the ear portion has the inner circumferential ear portion that is provided on the inner circumferential side of the slot coil and extends to one side of the circumferential direction, and the outer circumferential ear portion that is provided on the outer circumferential side of the slot coil and extends to the other side of the circumferential direction. Therefore, the slot coil can be fixed to the stator core with a good balance.

According to aspect (3), the projecting portion provided in the ear portion is fitted and welded to the accommodation portion provided in the one end surface of the stator core. As a result, the slot coil can be more reliably fixed to the stator core.

According to aspect (4), by inserting the welding gun into the through hole or the depressed portion provided in the projecting portion to melt the projecting portion, the molten insulating material engages with projected and depressed portions of the laminated steel sheets. As a result, the slot coil can be more reliably fixed to the stator core.

According to aspect (5), the insulating material that covers the slot coil has the ear portion on the outer circumferential surface thereof, and the ear portion is welded to the one end surface of the stator core. As a result, the slot coil can be easily fixed to the stator core. In addition, since the slot coil is not press-fitted, a part of the insulating material or an end portion of the steel sheet that projects in the slot is not broken during press-fitting, and does not stay in the slot. Therefore, the broken portion can be prevented from becoming foreign matter during use of the electric rotary machine.

According to aspect (6), the ear portion includes: the inner circumferential ear portion that is provided on the inner circumferential side of the slot coil and extends to one side of the circumferential direction; and the outer circumferential ear portion that is provided on the outer circumferential side of the slot coil and extends to the other side of the circumferential direction. Therefore, the slot coil can be fixed to the stator core with a good balance. In addition, the ear portions of the slot coils inserted into the slots adjacent to each other in the circumferential direction do not interfere with each other.

According to aspect (7), in slot coils inserted into the slots adjacent to each other in the circumferential direction, the outer circumferential ear portion of one slot coil overlaps with the inner circumferential ear portion of another slot coil in the circumferential direction. Therefore, the dimension of the stator core can be reduced while avoiding the interference between the ear portions.

According to aspect (8), the projecting portion provided in the ear portion is fitted and welded to the accommodation portion provided in the one end surface of the stator core. As a result, the slot coil can be more reliably fixed to the stator core.

According to aspect (9), by inserting the welding gun into the through hole or the depressed portion provided in the projecting portion to melt the projecting portion, the molten insulating material engages with projected and depressed portions of the laminated steel sheets. As a result, the slot coil can be more reliably fixed to the stator core.

According to aspect (10), the insulating material that covers the slot coil has the ear portion on the outer circumferential surface thereof, and the ear portion is welded to the one end surface of the stator core. As a result, the slot coil can be easily fixed to the stator core. In addition, since the slot coil is not press-fitted, a part of the insulating material or an end portion of the steel sheet that projects in the slot is not broken during press-fitting, and does not stay in the slot. Therefore, the broken portion can be prevented from becoming foreign matter during use of the electric rotary machine.

According to aspect (11), the slot coil can be easily and reliably welded to the stator core.

DETAILED DESCRIPTION

Figure 1:
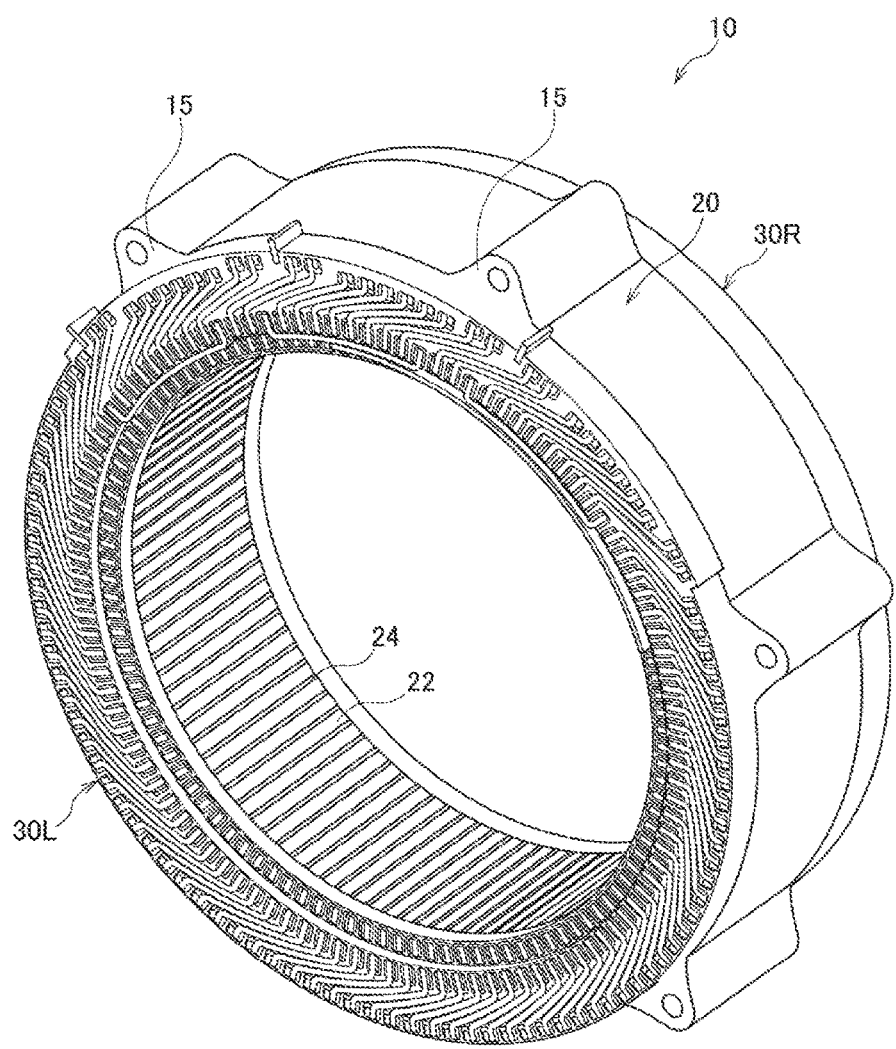
FIG. 1 is a perspective view illustrating a stator for an electric rotary machine according to an embodiment of the present invention.

Hereinafter, an embodiment of a stator for an electric rotary machine according to the present invention will be described with reference to the accompanying drawings. It should be noted that the drawings are seen such that reference numerals look properly oriented.

[Stator]

Figure 2:
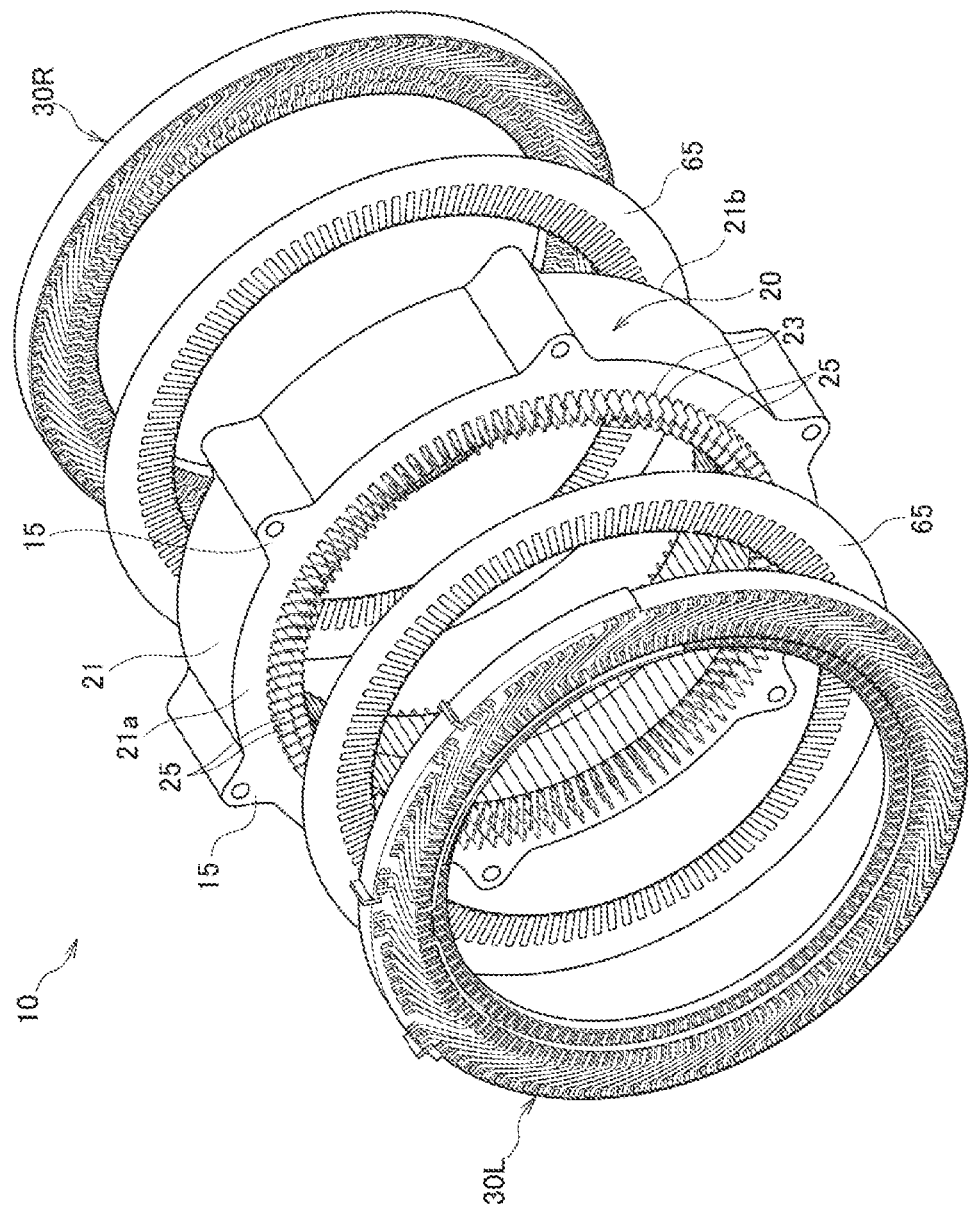
FIG. 2 is an exploded perspective view of the stator.

As illustrated in FIGS. 1 and 2, a stator 10 for an electric rotary machine according to the embodiment includes a stator core assembly 20 and a pair of base plate assemblies 30L, and 30R, and the base plate assemblies 30L, and 30R are disposed on opposite sides of the stator core assembly 20. For example, an insulating sheet 65 such as a silicon sheet is disposed between the stator core assembly 20 and each of the base plate assemblies 30L and 30R to insulate the stator core assembly 20 and each of the base plate assemblies 30L and 30R from each other.

[1 Stator Core Assembly]

The stator core assembly 20 includes a stator core 21 and plural slot coils 25.

[1-1 Stator Core]

The stator core 21 is obtained by laminating, for example, plural press-punched silicon steel sheets and includes, on a radially inner side, plural teeth 22 and plural slots 23 that are formed between adjacent teeth 22, respectively. The slot 23 is formed to penetrate the stator core 21 in an axial direction, has a substantially elliptical shape that is long in a radial direction of the stator core 21 when seen from the axial direction, and has an opening portion 24 that is formed in an inner circumferential surface of the stator core 21. In an outer circumferential portion of the stator core 21, plural fastening portions 15 that fasten the stator core 21 to a housing (not illustrated) are provided.

Figure 14:
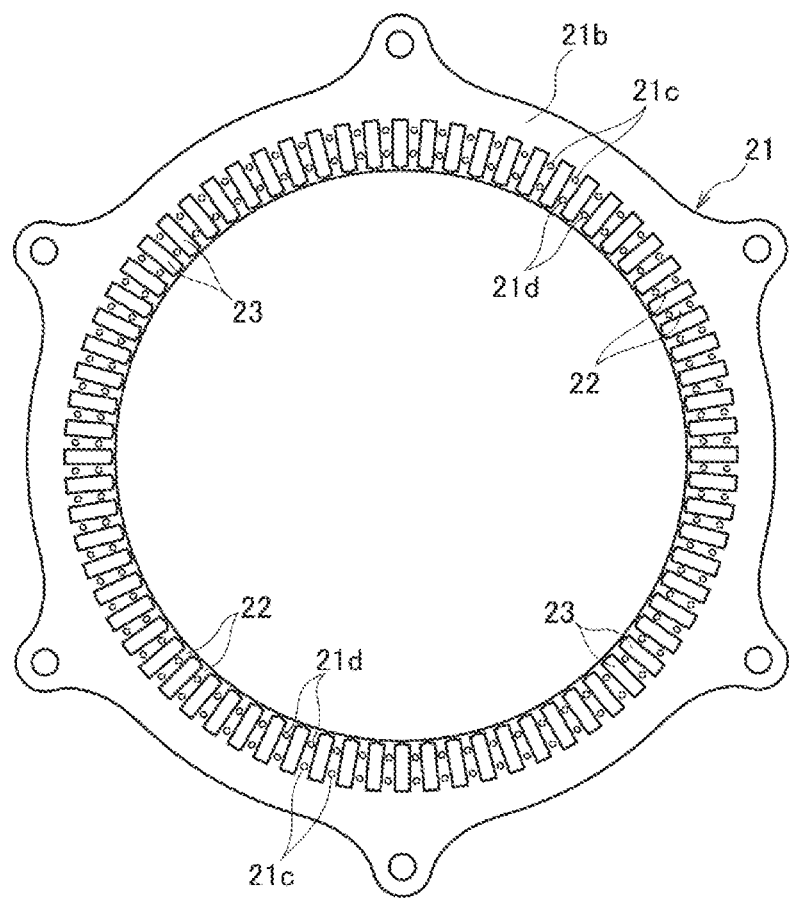
FIG. 14 is a front view illustrating a stator core.

In one end surface of the stator core 21 in the axial direction, in the embodiment, in an end surface 21b where the base plate assembly 30R is disposed, as illustrated in FIG. 14, an outer accommodation portion 21c and an inner accommodation portion 21d, which are two hole portions, are provided in each of the teeth 22 along the radial direction. The outer accommodation portion 21c and the inner accommodation portion 21d are provided in only plural silicon steel sheets (in the example of FIG. 17, four) from the outermost silicon steel sheet constituting the end surface 21b of the stator core 21, and have a function of fixing the slot coil 25 described below.

[1-2 Slot Coil]

Figure 5A:
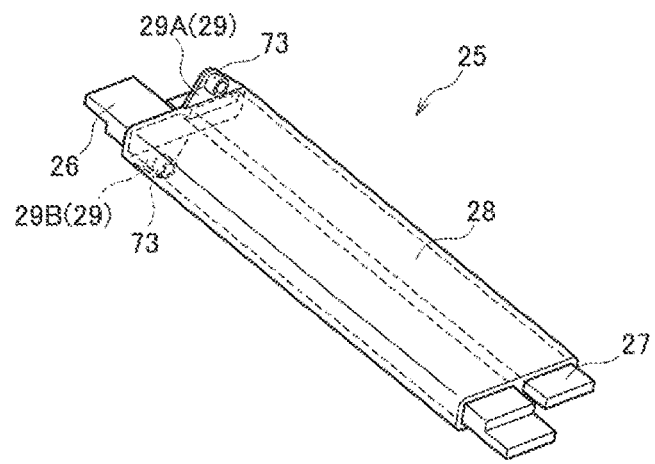
FIG. 5A is a perspective view illustrating a slot coil.
Figure 5B:
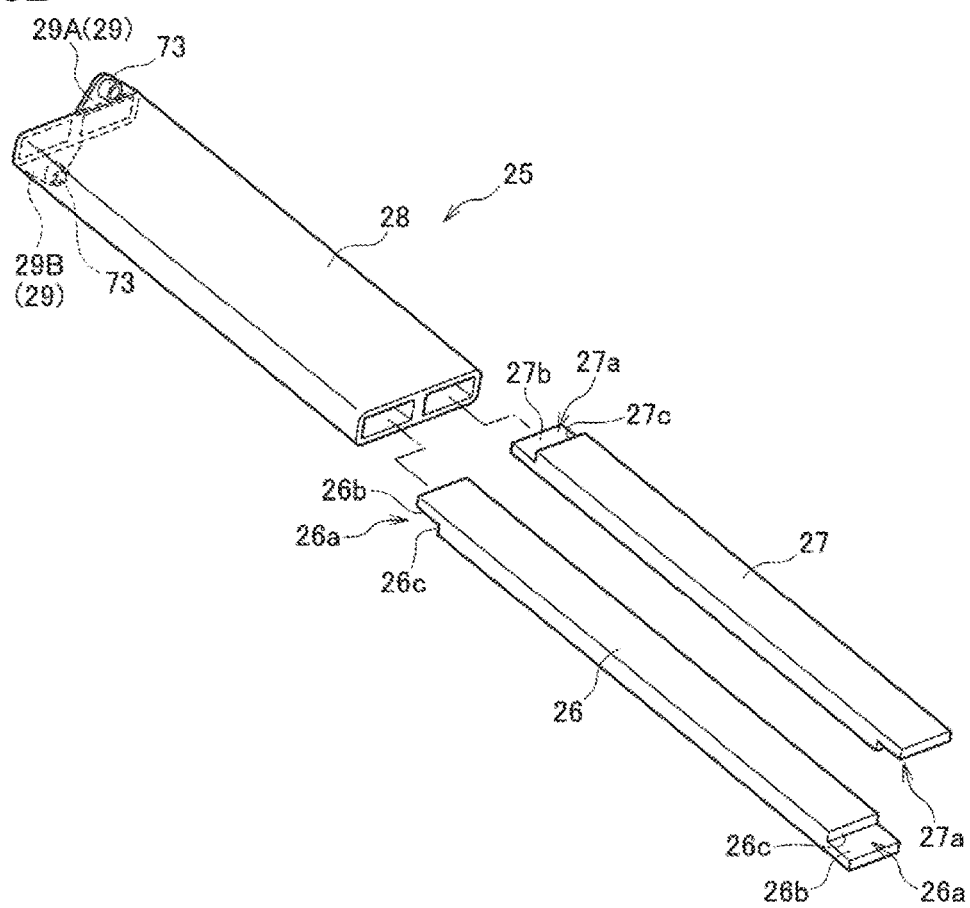
FIG. 5B is an exploded perspective view illustrating the slot coil.
Figure 6:
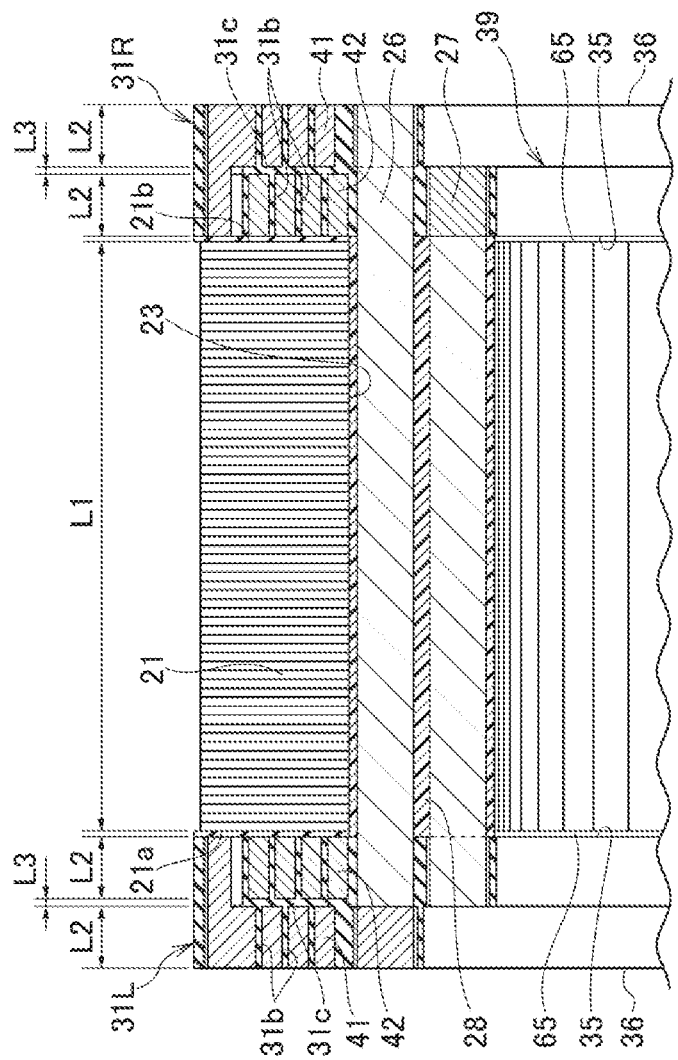
FIG. 6 is a longitudinal sectional view illustrating a part of the stator.

Referring to FIGS. 5A, 5B, and 6, the slot coil 25 inserted into each of the slots 23 has a radially outer slot coil 26 and a radially inner slot coil 27 that are plate-shaped conductors having a rectangular shape in cross-section. The radially outer slot coil 26 and the radially inner slot coil 27 are integrally formed in a state where the circumference thereof excluding opposite end portions in the axial direction is covered with an insulating material 28, such as an injected resin, having a rectangular shape in cross-section. Specifically, the radially outer slot coil 26 is set to have a length (L1+4×L2) that is substantially the same as the sum of an axial width L1 of the stator core 21 and an axial width (4×L2) of four connection coils 40 described below. Opposite end portions of the radially outer slot coil 26 in the axial direction are exposed from the insulating material 28 by a length (2×L2) that is substantially the same as an axial width of two connection coils 40. Further, in one end portion of the radially outer slot coil 26 in the axial direction, a surface facing one side of the circumferential direction is cut stepwise to reduce the thickness by a length (L2) that is the same as an axial width of one connection coil 40. As a result, a step portion 26a is formed. In the other end portion of the radially outer slot coil 26 in the axial direction, a surface facing the other side of the circumferential direction is cut stepwise to reduce the thickness by a length (L2) that is the same as an axial width of one connection coil 40. As a result, a step portion 26a is formed.

The radially inner slot coil 27 is set to have a length (L1+2×L2) that is substantially the same as the sum of an axial width (L1) of the stator core 21 and an axial width (2×L2) of two connection coils 40 described below. Opposite end portions of the radially outer slot coil 26 in the axial direction are exposed from the insulating material 28 by a length (L2) that is substantially the same as an axial width of one connection coil 40. Further, in one end portion of the radially inner slot coil 27 in the axial direction, a surface facing the other side of the circumferential direction is cut stepwise to reduce the thickness by a length (L2) that is the same as an axial width of one connection coil 40. As a result, a step portion 27a is formed. In the other end portion of the radially inner slot coil 27 in the axial direction, a surface facing the one side of the circumferential direction is cut stepwise to reduce the thickness by a length (L2) that is the same as an axial width of one connection coil 40. As a result, a step portion 27a is formed.

In other words, in the slot coil 25, opposite sides of the radially outer slot coil 26 in the axial direction are exposed from the insulating material 28 by a length (2×L2) that is substantially the same as an axial width of two connection coils 40, respectively. Opposite sides of the radially inner slot coil 27 in the axial direction are exposed from the insulating material 28 by a length (L2) that is substantially the same as an axial width of one connection coil 40, respectively. In opposite tip end portions of the radially outer slot coil 26 and opposite tip end portions of the radially inner slot coil 27, the step portions 26a and the step portions 27a are formed by a length (L2) that is substantially the same as an axial width of one connection coil 40, respectively, such that they face opposite to each other in the circumferential direction. In addition, in one end portion in the axial direction and the other end portion in the axial direction, the step portions 26a of the radially outer slot coil 26 and the step portions 27a of the radially inner slot coil 27 are formed to face opposite to each other in the circumferential direction, respectively.

Figure 15:
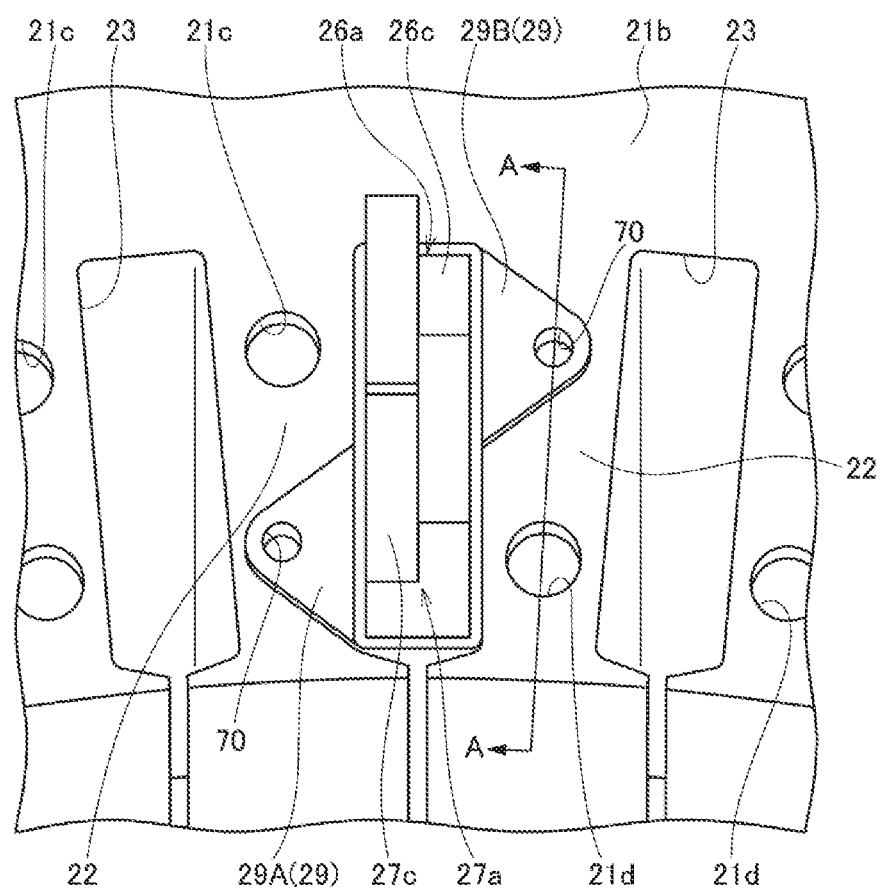
FIG. 15 is an enlarged perspective view illustrating a state where a slot coil covered with an insulating material is inserted into one slot of the stator core.
Figure 16:
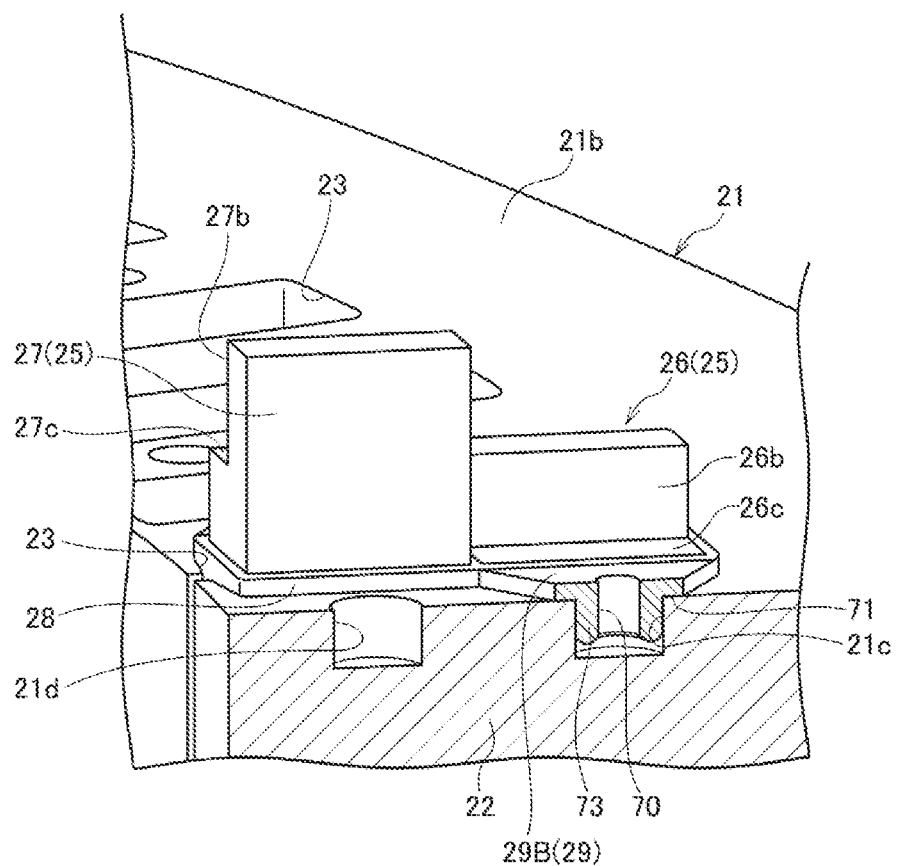
FIG. 16 is a cross-sectional view taken along line A-A of FIG. 15.

In the insulating material 28, as illustrated in FIGS. 5A and 5B, an ear portion 29 is formed in an outer circumferential surface on one end side in a longitudinal direction (axial direction). By welding the ear portion 29 to the end surface 21b of the stator core 21, the slot coil 25 is fixed to the stator core 21. Referring to FIGS. 15 and 16, the ear portion 29 includes: an inner circumferential ear portion 29A that is provided on an inner circumferential side of the slot coil 25 and extends to one side of the circumferential direction; and an outer circumferential ear portion 29B that is provided on an outer circumferential side of the slot coil 25 and extends to the other side of the circumferential direction. Further, in each of the inner circumferential ear portion 29A and the outer circumferential ear portion 29B of the ear portion 29, a through hole 70 into which a welding gun G described below is inserted is provided, and a projecting portion 73 surrounding to the through hole 70 is integrally formed in another end side in the longitudinal direction (axial direction) from a bottom surface 71. The projecting portion 73 of the outer circumferential ear portion 29B is fitted to the outer accommodation portion 21c formed in the end surface 21b of the stator core 21, and the projecting portion 73 of the inner circumferential ear portion 29A is fitted to the inner accommodation portion 21d formed in the end surface 21b of the stator core 21. The through hole 70 provided in the ear portion 29 may be a depressed portion into which the welding gun G is inserted.

Figure 18:
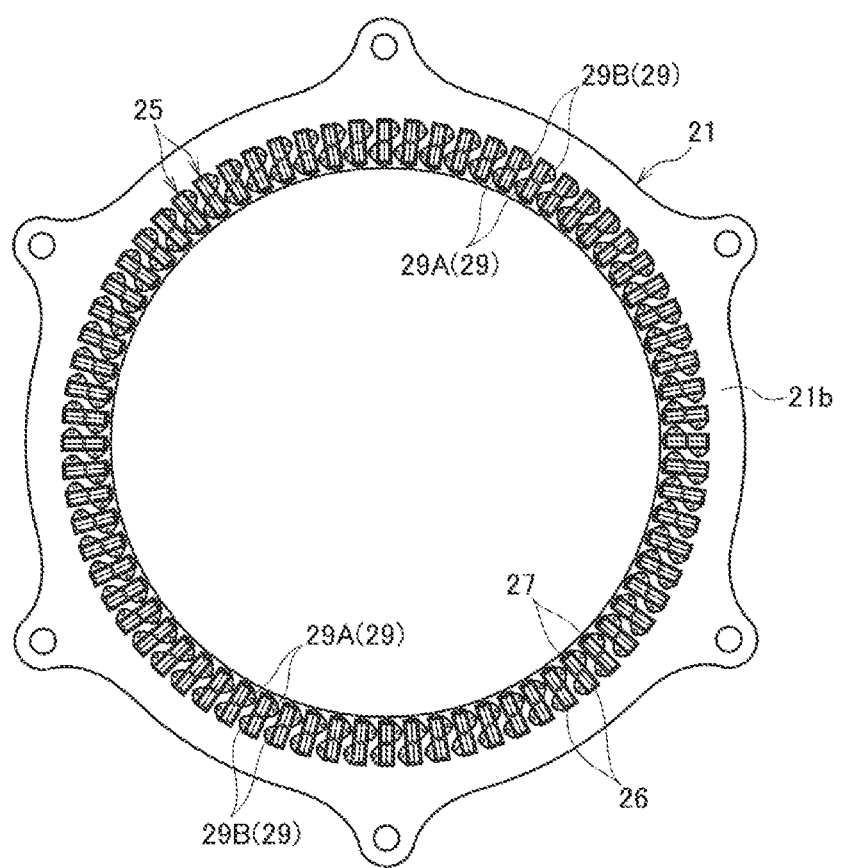
FIG. 18 is a front view of the stator core illustrating a state where slot coils covered with the insulating material are inserted into all the slots of the stator core, respectively.

The plural slot coils 25 including the radially outer slot coil 26 and the radially inner slot coil 27 are disposed in the radial direction of the stator core 21 such that the radially outer slot coil 26 in each of the slots 23 is disposed radially outward and the radially inner slot coil 27 in each of the slots 23 is disposed radially inward. The respective slot coils 25 are inserted into the plural slots 23 of the stator core 21 and are disposed in the circumferential direction of the stator core 21 to constitute the stator core assembly 20. In the stator core assembly 20, as illustrated in FIG. 18, in slot coils inserted into the slots 23 adjacent to each other in the circumferential direction, the outer circumferential ear portion 299 of one slot coil 25 overlaps with the inner circumferential ear portion 29A of another slot coil 25 in the circumferential direction.

The radially outer slot coil 26 is inserted into the slot 23 such that the tip end portions thereof project from the end surfaces 21a and 21b of the stator core 21 by a length (2×L2) that is substantially the same as an axial width of substantially two connection coils 40, respectively. The radially inner slot coil 27 is inserted into the slot 23 such that the tip end portions thereof project from the end surfaces 21a and 21b of the stator core 21 by a length (L2) that is the same as an axial width of substantially one connection coils 40, respectively.

In addition, the insulating material 28 covering the radially outer slot coil 26 and the radially inner slot coil 27 is interposed between the slot coils 26, 27 and the slot 23 of the stator core 21 to ensure insulation from the stator core 21.

Regarding the insulating material 28 covering the radially outer slot coil 26 and the radially inner slot coil 27, an outer circumferential surface excluding the ear portion 29 is slightly smaller than the slot 23 and has substantially the same shape as the slot 23. As the insulating material 28, for example, an epoxy resin or an enamel resin can be used.

[1-3 Construction of Stator Core Assembly]

In order to construct the stator core assembly 20 having the above-described configuration, the slot coil 25 is disposed in each of the slots 23 of the stator core 21 (slot coil disposing step). At this time, the projecting portion 73 of the outer circumferential ear portion 29B is fitted to the outer accommodation portion 21c formed in the end surface 21b of the stator core 21, and the projecting portion 73 of the inner circumferential ear portion 29A is fitted to the inner accommodation portion 21d formed in the end surface 21b of the stator core 21.

Figure 17:
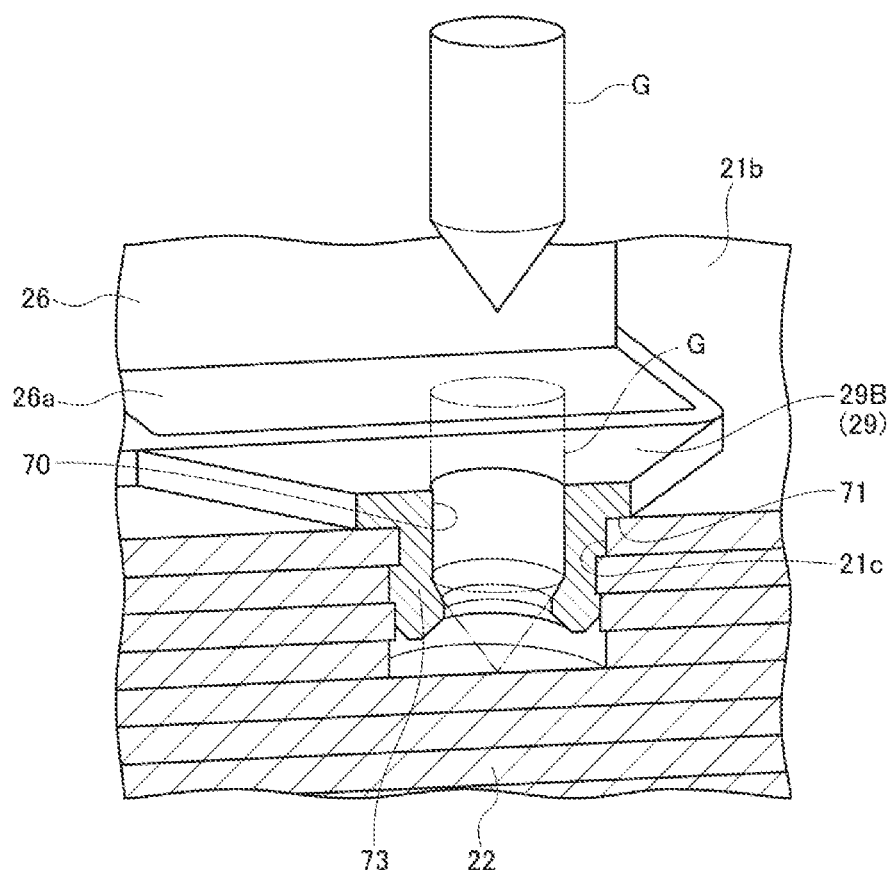
FIG. 17 is a partially enlarged view of FIG. 16 illustrating a welding process.

Next, as illustrated in FIGS. 17, the welding guns G of a spot welding machine are inserted into the through holes 70 formed in the inner circumferential ear portion 29A and the outer circumferential ear portion 29B to melt the projecting portions 73, and then the projecting portions 73 are cooled. As a result, the projecting portions 73 are fixed to the inner accommodation portion 21d and the outer accommodation portion 21c (welding step). At this time, the end surface of the silicon steel sheet constituting the inner accommodation portion 21d and the outer accommodation portion 21c has a step portion due to a variation. Therefore, the molten insulating material engages with the step portion, and thus the projecting portions 73 are more reliably fixed to the inner accommodation portion 21d and the outer accommodation portion 21c. As the spot welding, an impulse welder (IPW) is preferable. In the impulse welder (IPW), a current is applied to a chip (resistor) of the welding gun to heat a tip end portion by Joule heating, and compressed air is blown through the tip end portion of the chip to cool and fix the insulating material after welding. In this way, the slot coil 25 is positioned in the axial direction, the circumferential direction, and the radial direction with respect to the stator core 21 (refer to FIG. 18).

[2 Base Plate Assembly]

Figure 3:
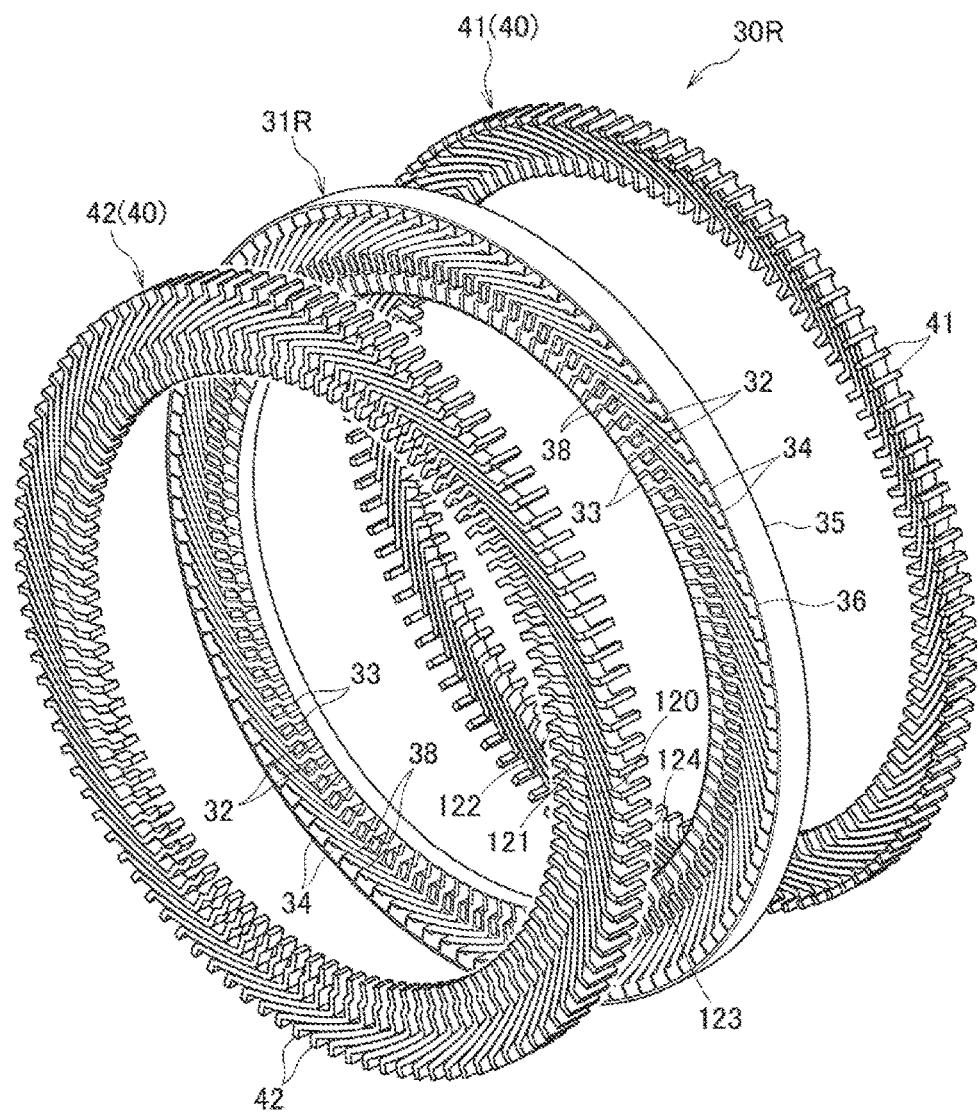
FIG. 3 is an exploded perspective view illustrating one base plate assembly.
Figure 4:
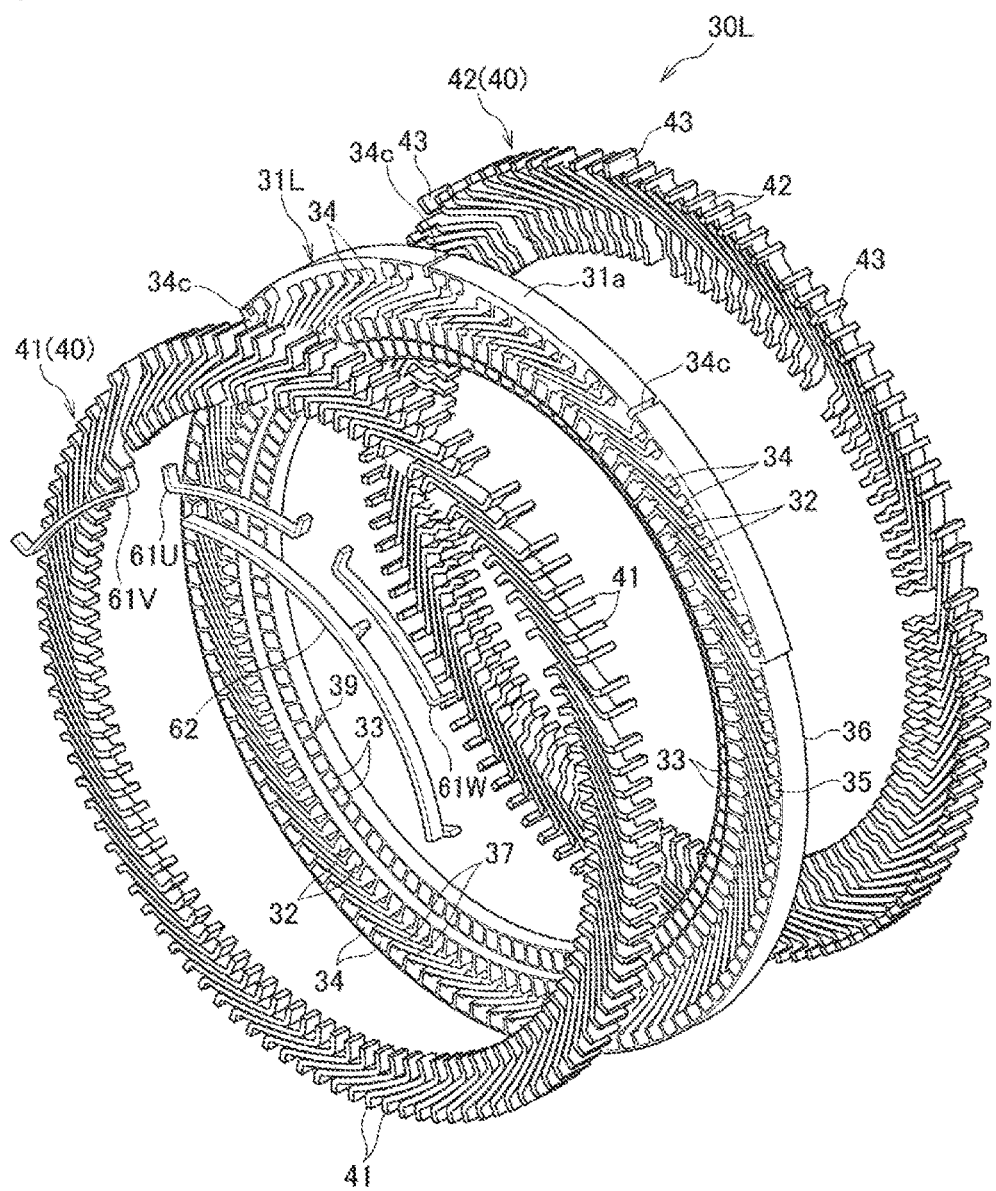
FIG. 4 is an exploded perspective view illustrating the other base plate assembly.

As illustrated in FIGS. 3 and 4, the base plate assemblies 30L and 30R disposed on the opposite sides of the stator core assembly 20 include base plates 31L and 31R and plural connection coils 40, respectively.

[2-1 Base Plate]

The base plates 31L and 31R are formed of an insulating resin (nonmagnetic material) and are substantially annular members having substantially the same inner and outer diameters as the stator core 21.

In the radially inner sides of the base plates 31L and 31R, as illustrated in FIGS. 3 and 4, plural radially outer through holes 32 and plural radially inner through holes 33 are formed at regular intervals so as to correspond to the radially outer slot coils 26 and the radially inner slot coils 27 of the slot coils 25 inserted into the slots 23 of the stator core 21 such that they penetrate the base plate 31R and make an outer surface 35 and an inner surface 36 communicate with each other. By assembling the base plate assemblies 30L and 30R into the stator core assembly 20, tip end portions of the radially outer slot coils 26, which are inserted into the slots 23 of the stator core 21 and project from the end surfaces of 21a and 21b of the stator core 21, are disposed in the radially outer through holes 32 of the base plates 31L and 31R, and tip end portions of the radially inner slot coil 27, which are inserted into the slots 23 of the stator core 21 and project from the end surfaces of 21a and 21b of the stator core 21, are disposed in the radially inner through hole 33 of the base plates 31L and 31R.

Figure 7:
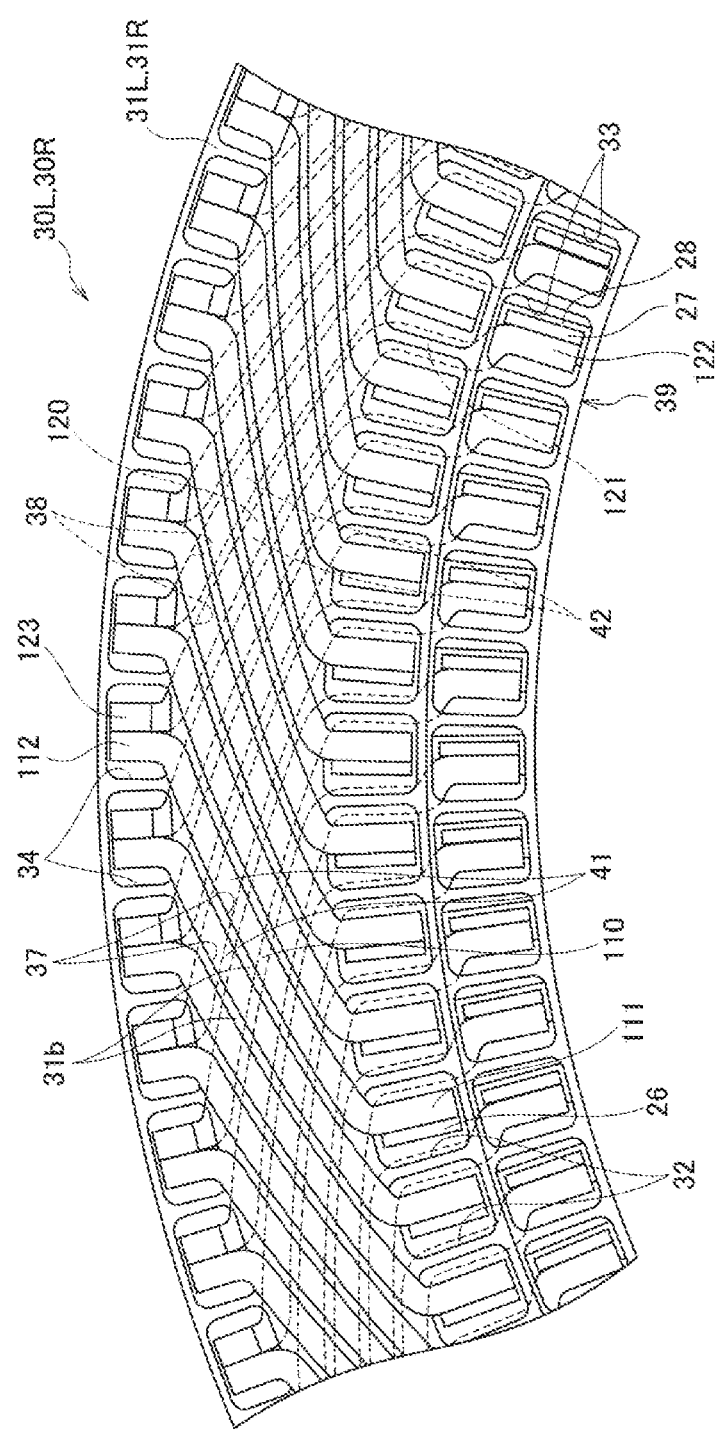
FIG. 7 is a front view illustrating a part of the base plate assembly.

In the radially outer sides of the base plates 31L and 31R, plural connection coil joining holes 34 are further formed at regular intervals such that they penetrate the base plates 31L and 31R and make the outer surface 35 and the inner surface 36 communicate with each other. In the outer surface 35 and the inner surface 36 of the base plate 31L and 31R, as illustrated in FIG. 7, plural outer surface grooves 37 and plural inner surface grooves 38 are formed along involute curves to be approximated to the circumferential direction, respectively. The outer surface grooves 37 and inner surface grooves 38 have openings in the outer surface 35 and the inner surface 36, respectively, and have a substantially U-shape in cross-section.

In the radially outer side of the base plate 31L, a fan-shaped portion that extends radially outward in a fan shape is provided in an upper region in the drawing. In the fan-shaped portion 31a, input terminal notch portions 34c, busbar notch portions (not illustrated), and a neutral point busbar notch portion (not illustrated) are provided. In the input terminal notch portions, input terminal portions 43 are disposed are formed at regular intervals for the respective phases. In the busbar notch portions, busbar connection portions of busbars 61U, 61V, and 61W that connect coils of the same phases are disposed. In the neutral point busbar notch portion, a neutral point busbar 62 that connect coils of U-phase, V-phase, and W-phase is provided.

In the connection coil joining holes 34 of the base plates 31L and 31R, radially outer end portions 112 of outer connection coils 41 described below and radially outer end portions 123 of inner connection coils 42 described below are disposed. Each of the radially outer through holes 32, the radially inner through holes 33, and the connection coil joining holes 34 has a rectangular shape when seen from the axial direction and has a larger space than a coil member disposed therein.

In the base plates 31L and 31R, as illustrated in FIG. 6, respective adjacent outer surface grooves 37, 37 and respective adjacent inner surface grooves 38, 38 are isolated from each other by partition walls 31b that are provided vertically from the base plate 31L. In addition, the outer surface grooves 37 and the inner surface groove 38 that face each other in the axial direction are isolated from each other by intermediate walls 31c.

In addition, in the base plates 31L and 31R, a radially innermost portion 39 where the radially inner through holes 33 are formed is to have a length (L2) that is the same as an axial width of one connection coil 40, and a region excluding the radially innermost portion 39 where the radially outer through holes 32 and the connection coil joining holes 34 are formed is set to have an axial width (2×L2+L3) that is substantially the same as the sum of an axial width (2×L2) of two connection coils 40 and a thickness (L3) of the intermediate wall 31c.

In the base plate assemblies 30L and 30R, as illustrated in FIG. 7, in a front view, each of the outer surface grooves 37 of the base plates 31L and 31R is formed to be curved along an involute curve such that the connection coil joining hole 34 is connected to the radially outer through hole 32 that is spaced counterclockwise from the connection coil joining hole 34 by a predetermined angle. FIG. 7 illustrates a state where the outer connection coils 41 and the inner connection coils 42 are accommodated in the outer surface grooves 37 and the inner surface grooves 38.

In addition, in the base plates 31L and 31R, in a front view, each of the inner surface grooves 38 is formed such that the connection coil joining hole 34 is curved to avoid the radially outer through hole 32 and is connected to the radially inner through hole 33 that is spaced counterclockwise (clockwise when seen from FIG. 7) from the connection coil joining hole 34 by a predetermined angle.

That is, the radially outer through holes 32 and the radially inner through holes 33 are connected to each other through the connection coil joining holes 34 where the outer surface grooves 37 and the inner surface grooves 38 are commonly continuous.

[2-2 Connection Coil]

The connection coils 40 are formed of a conductive material such as copper in a plate shape and can be divided into the outer connection coils 41 that are inserted into the outer surface grooves 37, respectively, and the inner connection coils 42 that are inserted into the inner surface grooves 38, respectively. When the stator core assembly 20 and the base plate assemblies 30L and 30R are assembled, the outer connection coils 41 described herein refer to the connection coils 40 that are positioned outside of the stator 10 in the axial direction, and the inner connection coils 42 described herein refer to the connection coils 40 that are positioned inside of the stator 10 in the axial direction.

In the outer connection coil 41 that is a plate-shaped conductor having a uniform thickness and a rectangular shape in cross-section, a radially inner end portion 111 is radially curved from an outer connection coil main body 110 that is formed along an involute curve having the same shape as the outer surface groove 37, and the radially outer end portion 112 is also radially curved from the outer connection coil main body 110. An outer connection coil extending portion 113 is formed so as to extend radially inward in the radially outer end portion 112 of the outer connection coil 41, An axial width (L2) of the outer connection coil main body 110 and the radially inner end portion 111 is set to be the same as a depth of the outer surface groove 37. An axial width (L4) of the outer connection coil extending portion 113 is set to be the same as an axial width (2×L2+L3) that is the same as the sum of a depth of each of the outer surface move 37 and the inner surface groove 38 and a thickness (L3) of the intermediate wall 31c.

In the inner connection coil 42 that is a plate-shaped conductor having a uniform thickness and a rectangular shape in cross-section, a radially inner end portion 122 is radially curved from an inner connection coil main body 120, which is formed along an involute curve having the same shape as the inner surface groove 38, through a bypass portion 121 that is formed to bypass the radially outer through hole 32, and the radially outer end portion 123 is also radially curved from the inner connection coil main body 120. An inner connection coil extending portion 124 is formed so as to extend radially outward in the radially outer end portion 123 of the inner connection coil 42. An axial width (L2) of the inner connection coil main body 120 and the radially inner end portion 122 is set to be the same as a depth of the inner surface groove 38. An axial width (L4) of the inner connection coil extending portion 124 is set to be the same as an axial width (2×L2+L3) that is the same as the sum of a depth of each of the outer surface groove 37 and the inner surface groove 38 and a thickness of the intermediate wall 31c.

The outer connection coil 41 and the inner connection coil 42 have the same thickness, and the thickness of the outer connection coil 41 and the inner connection coil 42 are set to be the same as the thickness of the radially outer slot coil 26 and the radially inner slot coil 27 that have the same thickness. The thickness of the outer connection coil 41 and the inner connection coil 42 is set to be less than an axial width (L2) of the outer connection coil 41 and the inner connection coil 42 (the outer connection coil main body 110 and the inner connection coil main body 120). "The axial width of x (x=1, 2, 4) connection coils 40" described above refers to the axial width of the outer connection coil main body 110 and the inner connection coil main body 120. In addition, "substantially the same" is an expression including an error corresponding to the intermediate wall 31*c*. The thickness of the insulating sheet 65 is not taken into consideration.

The outer connection coils 41, the inner connection coils 42, and the slot coils 25 can be formed to have a desired axial width and a desired planar shape by performing processing such as press punching on a metal sheet (for example, copper sheet) having a predetermined thickness. Further, regarding the outer connection coil 41, by bending a press-punched plate-shaped conductor, the outer connection coil main body 110 that is formed along an involute curve having the same shape as the outer surface groove 37, and the radially inner end portion 111 and the radially outer end portion 112 that are connected to be curved from the outer connection coil main body 110 can be formed. Likewise, regarding the inner connection coil 42, by bending a press-punched plate-shaped conductor, the inner connection coil main body 120 that is formed along an involute curve having the same shape as the inner surface groove 38, and the radially inner end portion 122 and the radially outer end portion 123 that are connected to be curved from the inner connection coil main body 120 can be formed.

Figure 13:
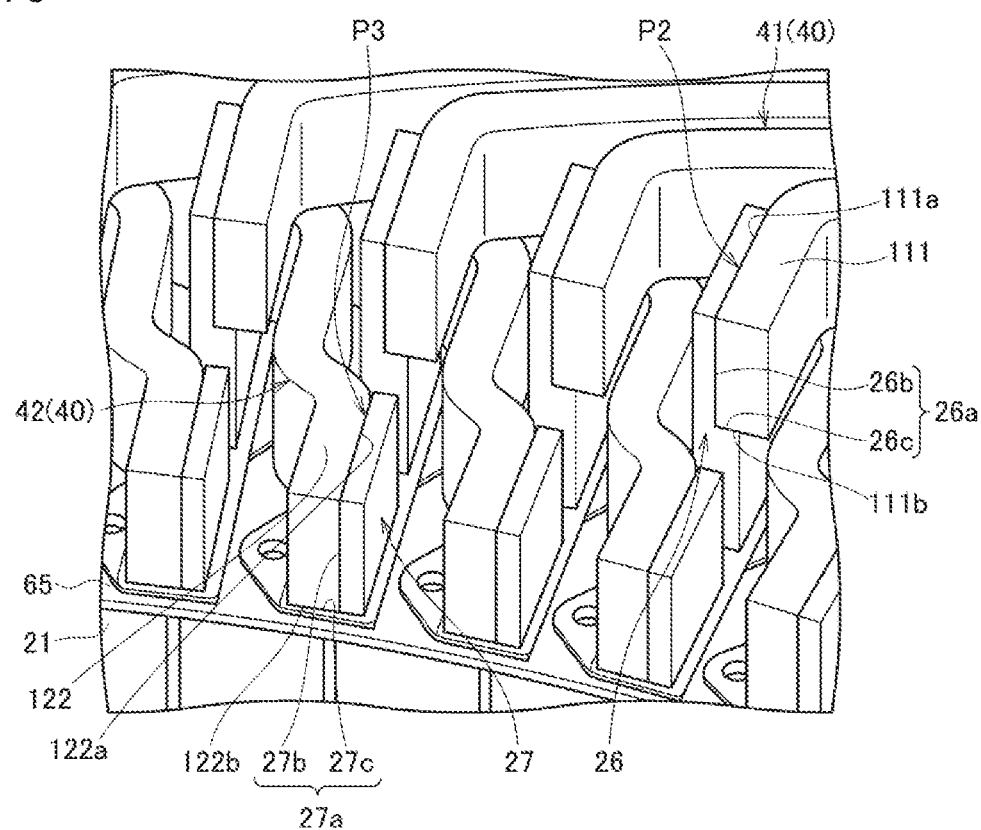
FIG. 13 is a perspective view illustrating the joining between a radially inner end portion of an outer connection coil and a step portion of a radially outer slot coil and the joining between a radially inner end portion of an inner connection coil and a step portion of a radially inner slot coil.

The outer connection coils 41 are inserted into the outer surface grooves 37 of the base plates 31L and 31R. The radially inner end portions 111 of the outer connection coils 41 are disposed in the radially outer through holes 32, and when the stator core assembly 20 and the base plate assemblies 30L and 30R are assembled as illustrated in FIG. 13, are inserted into the slots 23 of the stator core 21 and are brought into contact with the step portions 26*a* of the radially outer slot coils 26 disposed in the radially outer through holes 32.

The inner connection coils 42 are inserted into the inner surface grooves 38 of the base plates 31L and 31R. The radially inner end portions 122 of the inner connection coils 42 are disposed in the radially inner through hole 33, and when the stator core assembly 20 and the base plate assemblies 30L and 30R are assembled as illustrated in FIG. 13, are inserted into the slots 23 of the stator core 21 and are brought into contact with the step portions 27*a* of the radially inner slot coil 27 disposed in the radially inner through hole 33.

Figure 12:
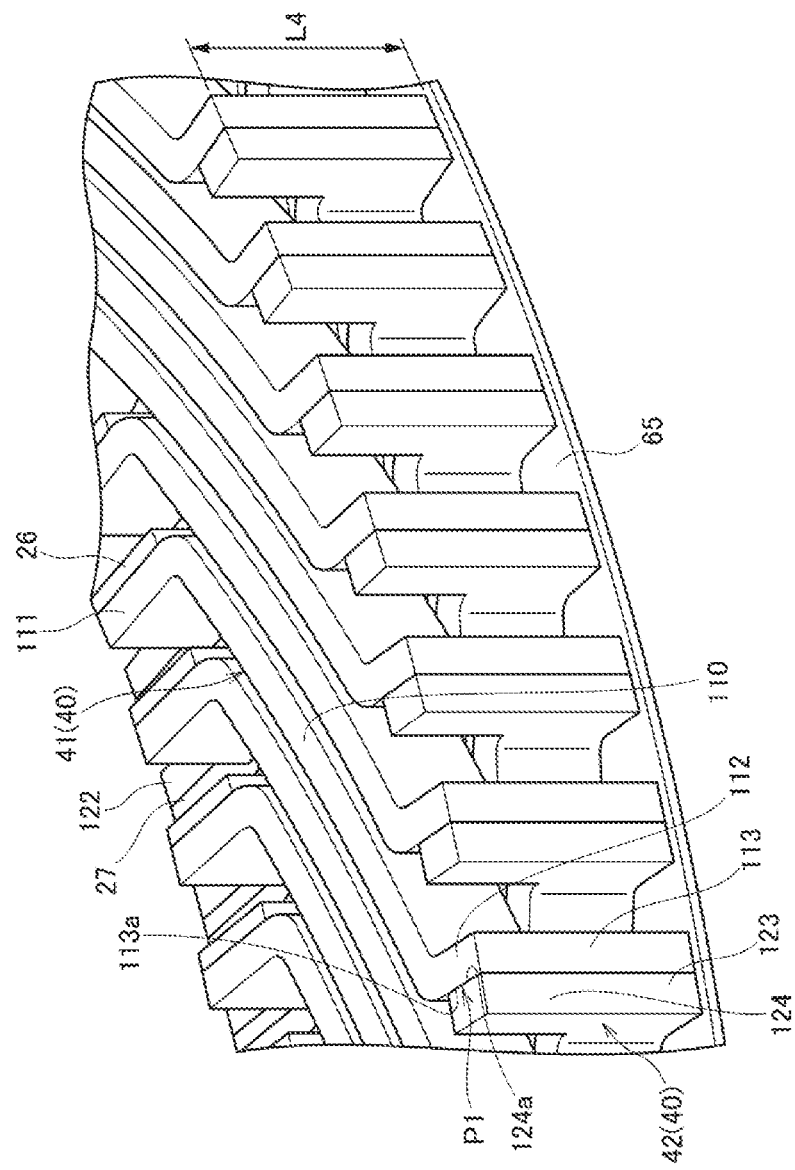
FIG. 12 is a perspective view illustrating the joining between an outer connection coil extending portion and an inner connection coil extending portion.

As illustrated in FIG. 12, the radially outer end portions 112 of the outer connection coils 41 and the radially outer end portions 123 of the inner connection coils 42 are disposed in the connection coil joining holes 34, and side surfaces 113*a* of the outer connection coil extending portions 113 facing one side of the circumferential direction and side surfaces 124*a* of the inner connection coil extending portions 124 facing the other side of the circumferential direction are in contact with each other over the entire area in the radial direction and the axial direction.

[3 Joining]

Regarding the radially inner end portions 111 of the outer connection coils 41 in contact with the step portions 26*a* of the radially outer slot coils 26, the radially inner end portions 122 of the inner connection coils 42 in contact with the step portions 27*a* of the radially inner slot coils 27, and the outer connection coil extending portions 113 of the outer connection coils 41 in contact with the inner connection coil extending portions 124 of the inner connection coil 42, flat plate surfaces that intersect with each other in the thickness direction are joined by welding, preferably laser welding. In the following description, an example where the flat plate surfaces are joined by laser welding will be described.

As illustrated in FIG. 12, regarding the outer connection coil extending portions 113 and the inner connection coil extending portions 124, flat plate surfaces that intersect with each other in the thickness direction and conform to the axial direction, that is, the side surfaces 113*a* of the outer connection coil extending portions 113 facing one side of the circumferential direction and the side surfaces 124*a* of the inner connection coil extending portions 124 facing the other side of the circumferential direction are disposed to face each other and are brought into contact with each other. As a result, the plate surfaces are in contact with each other over the entire area in the radial direction and the axial direction. In a state where the side surfaces 113*a* and 124*a* are in contact with each other, the side surfaces 113*a* and 124*a* are joined by laser welding along contact surfaces P1 that radially extend from the radially outer side of the connection coil joining holes 34. As a result, the radially outer end portions 112 of the outer connection coils 41 and the radially outer end portions 123 of the inner connection coils 42 that are positioned in the connection coil joining holes 34 are electrically connected, and the base plate assemblies 30L and 30R are configured. In FIG. 12, the base plates 31L and 31R are not illustrated. In FIG. 13, the base plates 31L and 31R are also not illustrated.

As illustrated in FIG. 13, the stator core assembly 20 and the base plate assemblies 30L and 30R are assembled into each other in the axial direction after interposing the insulating sheet 65 therebetween and determining relative positions thereof in the circumferential direction. As a result, the radially inner end portions 111 of the outer connection coils 41 are brought into contact with the step portions 26*a* of the radially outer slot coils 26, and the radially inner end portions 122 of the inner connection coils 42 are brought into contact with the step portions 27*a* of the radially inner slot coils 27. Thus, the stator core assembly 20 and the base plate assemblies 30L and 30R are positioned.

In the radially inner end portions 111 of the outer connection coils 41 in contact with the step portions 26*a* of the radially outer slot coils 26, side surfaces 111*a* as the flat plate surfaces facing the other side of the circumferential direction are in contact with the entire area of side surfaces 26*b* of the step portions 26*a*, and bottom surfaces 111*b* are in contact with the entire area of bottom surfaces 26*c* of the step portions 26*a*. In a state where the flat side surfaces 111*a* and 26*b* that intersect with each other in the thickness direction and conform to the axial direction are in contact with each other, the side surfaces 111*a* and 26*b* are joined by laser welding along contact surfaces P2 that radially extend from the radially outer side of the radially outer through holes 32.

In the radially inner end portions 122 of the inner connection coils 42 in contact with the step portions 27*a* of the radially inner slot coils 27, side surfaces 122*a* as the flat plate surfaces facing the one side of the circumferential direction are in contact with the entire area of side surfaces 27*b* of the step portions 27*a*, and bottom surfaces 122*b* are in contact with the entire area of bottom surfaces 27*c* of the step portions 27*a*. In a state where the flat side surfaces 122*a* and 27*b* that intersect with each other in the thickness direction and conform to the axial direction are in contact with each other, the side surfaces 122*a* and 27*b* are joined by laser welding along contact surfaces P3 that radially extend from the radially outer side of the radially inner through holes 33.

Through the above-described joining, in a state where the radially outer slot coils 26 and the radially inner slot coils 27 inserted into the slots 23 of the stator core 21 are electrically connected through the outer connection coils 41 and the inner connection coils 42, the base plate assemblies 30L and 30R are assembled into the stator core assembly 20. The outer connection coils 41 and the inner connection coils 42 connect the slot coils 25 of the same phase (for example, U-phase) to constitute extending portions of a coil 50.

Figure 9:
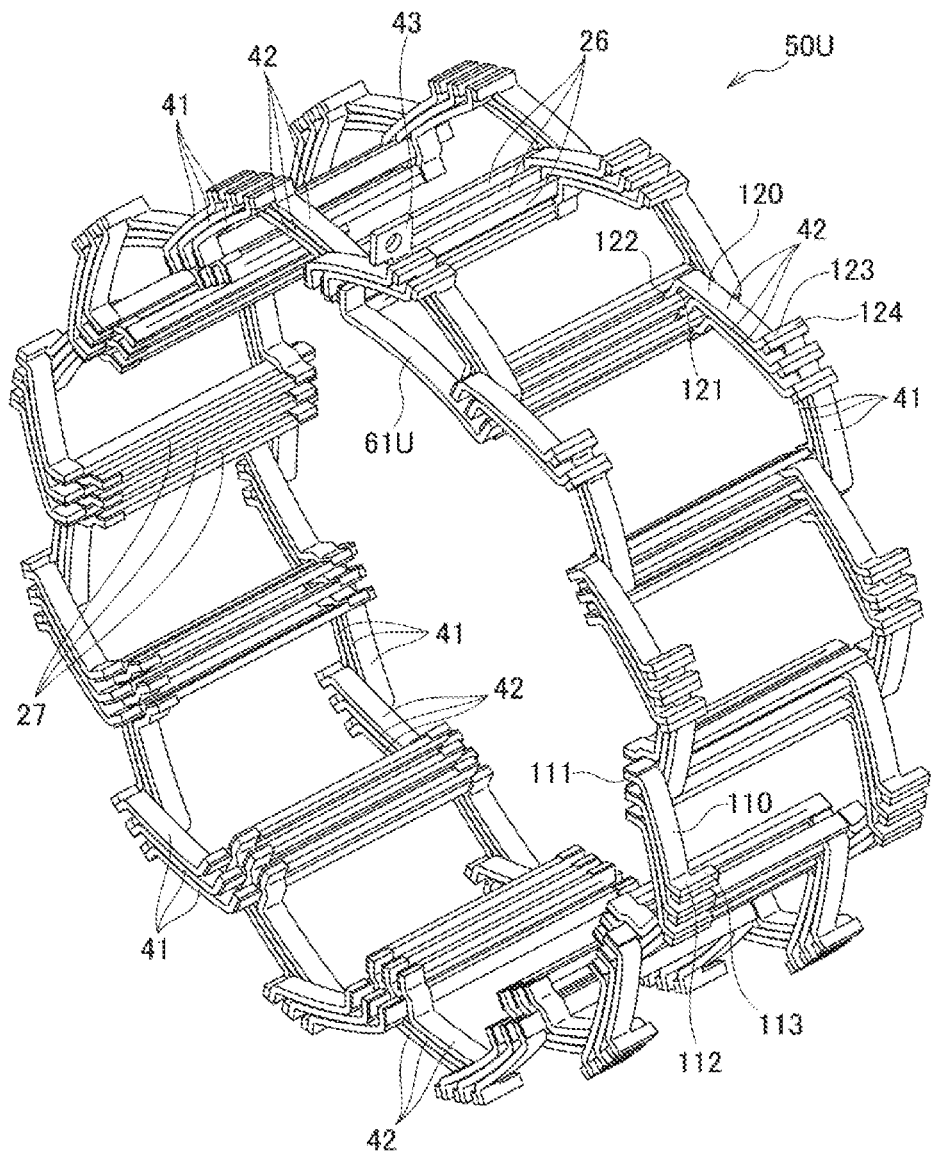
FIG. 9 is a perspective view illustrating coils of one phase taken out from the coils of the plural phases illustrated in FIG. 8.

Accordingly, for example, as illustrated in FIG. 9, regarding the radially outer slot coil 26 and the radially inner slot coil 27 disposed in the same slot 23, the outer connection coil 41 connected to one end side (front side in the drawing) of the radially outer slot coil 26 extends radially outward and clockwise and is connected to the inner connection coil 42 of the same phase, and the outer connection coil 41 connected to the other end side (depth side in the drawing) of the radially outer slot coil 26 extends radially outward and counterclockwise and is connected to the inner connection coil 42 of the same phase. In addition, the inner connection coil 42 connected to one end side (front side in the drawing) of the radially inner slot coil 27 extends radially outward and counterclockwise and is connected to the outer connection coil 41 of the same phase, and the inner connection coil 42 connected to the other end side (depth side in the drawing) of the radially inner slot coil 27 extends radially outward and clockwise and is connected to the outer connection coil 41 of the same phase.

Figure 8:
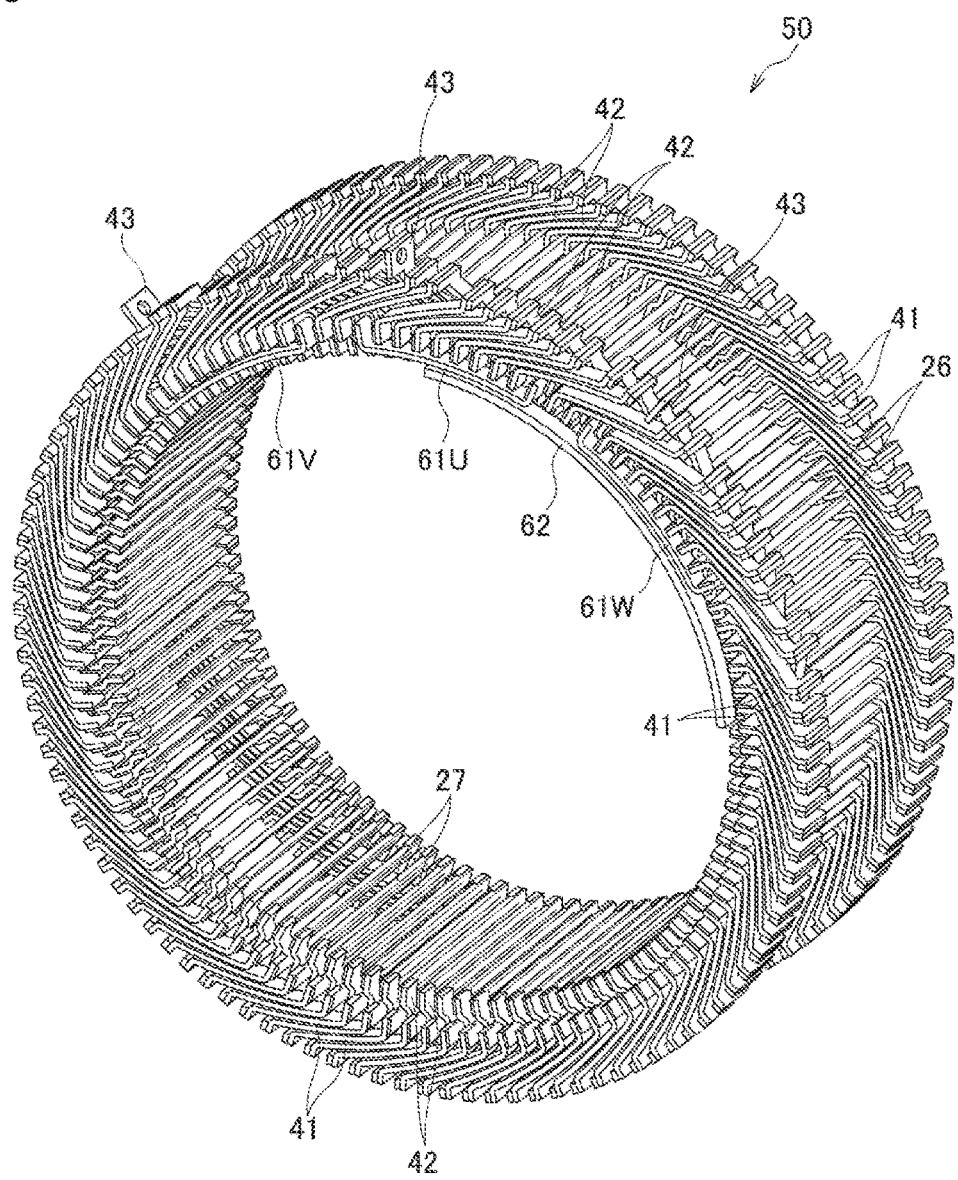
FIG. 8 is a perspective view illustrating coils of plural phases.
Figure 10:
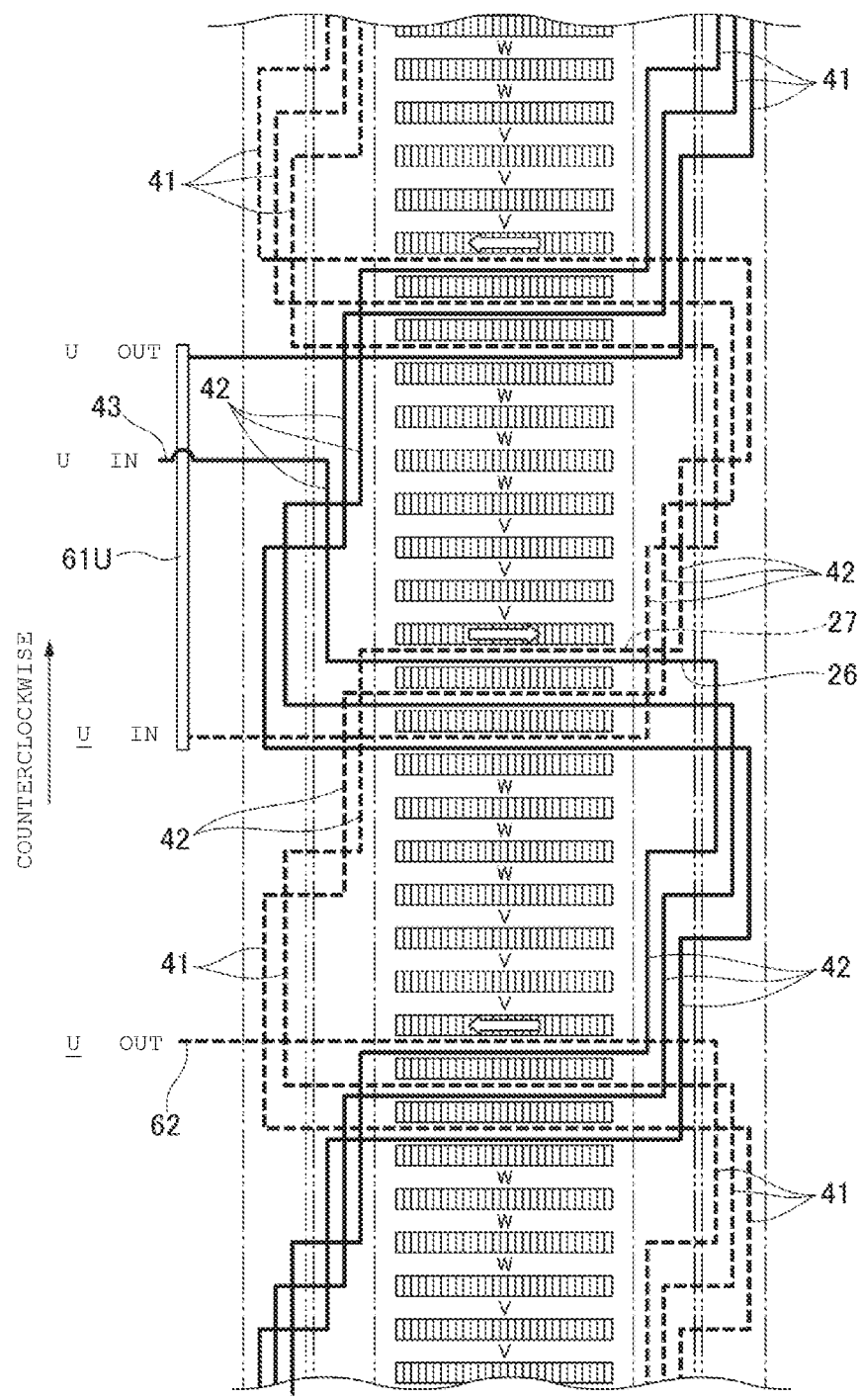
FIG. 10 is a development diagram illustrating a connection state of a U-phase coil.
Figure 11:
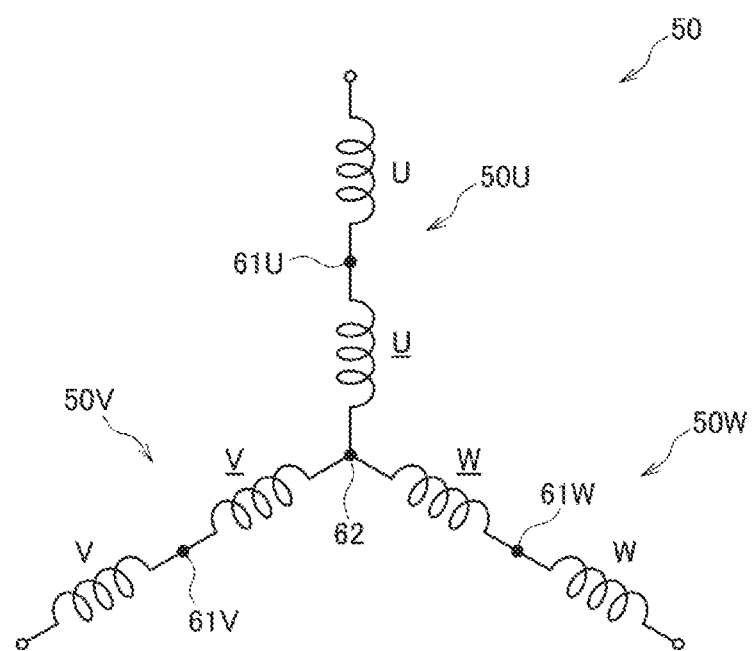
FIG. 11 is a schematic diagram illustrating connection states of U-phase, V-phase, and W-phase coils.

The stator 10 is configured by assembling the pair of base plate assemblies 30L and 30R to opposite sides of the stator core assembly 20. As a result, the segmented coil 50 forms six coil loops (a U-phase coil 50U, a V-phase coil 50V, and a W-phase coil loop 50W) having the same structure for each phase. Regarding the six coil loops (the U-phase coil 50U, the V-phase coil 50V, or the W-phase coil loop 50W) for each phase, when two coil loops are set as one set, three sets of U-phase coils 50U, three sets of V-phase coils 50V, and three sets of W-phase coils 50W are wound in this order counterclockwise (refer to FIG. 10). FIG. 8 is a perspective view illustrating segmented coils of plural phases taken out from the stator 10 for easy understanding. FIG. 9 is a perspective view illustrating coils of one phase (for example, U-phase) taken out from the coils of the plural phases. FIG. 10 is a development view illustrating a connection state of a U-phase coil. FIG. 11 is a schematic diagram showing connection states of U-phase, V-phase, and W-phase coils.

The connection states of respective phase coils will be described using an example of the U-phase coil with reference to FIG. 10. Regarding six coil loops constituting the U-phase coil, three coil loops (U loops) are continuously wound clockwise, and three coil loops (U loops) are continuously wound counterclockwise such that the U loops and the U loops are connected in series through the husbar 61U. The radially outer slot coil 26 and the radially inner slot coil 27 that are disposed in one slot 23 and are covered with the insulating material 28 are formed of the coil constituting the U loop and the coil constituting the U loop, respectively, and current flowing directions thereof are the same.

For example, focusing on one U loop, one end (right side in the drawing) of the radially outer slot coil 26 in the axial direction disposed in the U-phase slot 23 is connected to the outer connection coil 41 and the inner connection coil 42 in this order and then is connected to the radially inner slot coil 27 in the next U-phase slot 23. Next, the other end (left side in the drawing) of the radially inner slot coil 27 in the axial direction is connected to the inner connection coil 42 and the outer connection coil 41 in this order and then is connected to the radially outer slot coil 26 in the next U-phase slot 23. Hereinafter, this connection configuration is repeated to form the U loop.

Likewise, regarding six coil loops constituting the coil of each of the other two-phases, that is, constituting the V-phase coil (the W-phase coil), three V loops (W loops) and three V loops (W loops) that are wound in opposite directions are connected in series through the busbar 61U (busbar 61W). The radially outer slot coil 26 and the radially inner slot coil 27 that are disposed in one slot 23 are formed of the coil constituting the V loop (W loop) and the coil constituting the V loop (W loop), respectively, and current flowing directions thereof are the same. The U-phase coil 50U, the V-phase coil 50V, and the W-phase coil 50W are star-connected through the neutral point husbar 62 as illustrated in FIG. 11.

[4 Summary]

As described above, in the stator 10 for an electric rotary machine according to the embodiment, the ear portion 29 is provided in the outer circumferential surface of the insulating material 28 that covers the slot coil 25, and the ear portion 29 is welded to the end surface 21b of the stator core 21. As a result, the slot coil 25 can be easily fixed to the stator core 21. In addition, since the slot coil 25 is not press-fitted, a part of the insulating material 28 or an end portion of the silicon steel sheet that projects in the slot 23 is not broken during press-fitting, and does not stay in the slot. Therefore, the broken portion can be prevented from becoming foreign matter during use of the electric rotary machine.

In addition, the ear portion 29 has the inner circumferential ear portion 29A that is provided on the inner circumferential side of the slot coil 25 and extends to one side of the circumferential direction, and the outer circumferential ear portion 29B that is provided on the outer circumferential side of the slot coil 25 and extends to the other side of the circumferential direction. Therefore, the slot coil 25 can be fixed to the stator core 21 with a good balance. In addition, the ear portions 29 of the slot coils 25 inserted into the slot coils 23 adjacent to each other in the circumferential direction do not interfere with each other.

In addition, in slot coils inserted into the slots 23 adjacent to each other in the circumferential direction, the outer circumferential ear portion 29B of one slot coil 25 overlaps with the inner circumferential ear portion 29A of another slot coil 25 in the circumferential direction. Therefore, the dimension of the stator core 21 can be reduced while avoiding the interference between the ear portions 29.

In addition, the projecting portion 73 provided in the ear portion 29 is fitted and welded to the outer accommodation portion 21c and the inner accommodation portion 21d provided in the end surface 21b of the stator core 21. As a result, the slot coil 25 can be more reliably fixed to the stator core 21. Instead of fitting and welding the projecting portion 73 to the outer accommodation portion 21c and the inner accommodation portion 21d, the bottom surface 71 of the ear portion 29 may be welded to the end surface 21b of the stator core 21.

In addition, by inserting the welding gun G into the through hole 70 provided in the projecting portion 73 to melt the projecting portion 73, the molten insulating material 28 engages with projected and depressed portions of the laminated silicon steel sheets. As a result, the slot coil 25 can be more reliably fixed to the stator core 21. Instead of the through hole 70, a depressed portion may be provided in the projecting portion 73.

The present invention is not limited to the above-described embodiments, and modifications, improvements, and the like can be appropriately made.

For example, in the embodiment, a triple slot type stator in which coils of the same phase are disposed in every three slots adjacent to each other in the circumferential direction has been described as an example, but the present invention is not limited thereto. A single slot type stator in which coils of the same phase are disposed in every one slot in the circumferential direction, or a double slot type stator in which coils of the same phase are disposed in every two slots adjacent to each other in the circumferential direction may be used.

In addition, regarding the connection of the coil, the present invention is not limited to the embodiment. An arbitrary specification can be selected, and a series connection or a parallel connection can also be appropriately selected.

In addition, the slot coil 25 is not limited to a plate-shaped conductor having a rectangular shape in cross-section and may be a cylindrical conductor having a circular shape in cross-section or a columnar conductor having a polygonal shape in cross-section. The connection between the slot coils 25 and the connection coils 40 are not limited to connection by welding and may be fastening by swaging. By forming the slot coil using a plate-shaped conductor, the slot coil in which a slit is formed by pressing or the like in a predetermined position can be easily manufactured.

In addition, an insulating cover may be disposed on the radially outer side of the pair of base plate assemblies 30L and 30R, or the radially outer side may be covered with a resin or the like.

The invention claimed is:

1. A slot coil that is inserted into a slot provided in a stator core, wherein
    the slot coil is covered with an insulating material,
    the insulating material has an ear portion on an outer circumferential surface thereof, and
    the slot coil is fixed to the stator core by the ear portion welded to one end surface of the stator core.

2. The slot coil according to claim 1, wherein
    the ear portion has an inner circumferential ear portion that is provided on an inner circumferential side of the slot coil and extends to a first side of a circumferential direction, and an outer circumferential ear portion that is provided on an outer circumferential side of the slot coil and extends to a second side of the circumferential direction, the second side being opposite to the first side in the circumferential direction.

3. The slot coil according to claim 1, wherein
    the ear portion has a projecting portion that is fitted to an accommodation portion provided in the one end surface of the stator core.

4. The slot coil according to claim 3, wherein
    the projecting portion has a through hole or a depressed portion into which a welding gun is inserted.

5. A stator for an electric rotary machine comprising:
    a stator core that includes a plurality of slots; and
    a coil that is attached to the stator core, wherein
    the coil includes a plurality of slot coils that are inserted into the slots, and a plurality of connection coils through which the slot coils are connected to each other on an outside side of an end surface of the stator core in an axial direction,
    each of the slot coils and each of the connection coils are connected to each other at a contact portion,
    the slot coil is covered with an insulating material,
    the insulating material has an ear portion on an outer circumferential surface thereof, and
    the slot coil is fixed to the stator core by the ear portion welded to one end surface of the stator core.

6. The stator for an electric rotary machine according to claim 5, wherein
    the ear portion has an inner circumferential ear portion that is provided on an inner circumferential side of the slot coil and extends to a first side of a circumferential direction, and an outer circumferential ear portion that is provided on an outer circumferential side of the slot coil and extends to a second side of the circumferential direction, the second side being opposite to the first side in the circumferential direction.

7. The stator for an electric rotary machine according to claim 6, wherein
    in slot coils inserted into the slots adjacent to each other in the circumferential direction, the outer circumferential ear portion of one slot coil overlaps with the inner circumferential ear portion of another slot coil in the circumferential direction.

8. The stator for an electric rotary machine according to claim 5, wherein
    the ear portion has a projecting portion that is fitted to an accommodation portion provided in the one end surface of the stator core.

9. The stator for an electric rotary machine according to claim 8, wherein
    the projecting portion has a through hole or a depressed portion into which a welding gun is inserted.

10. A method of manufacturing the stator for an electric rotary machine according to claim 5, the method comprising:
    a slot coil disposing step of inserting the slot coil into the slot of the stator core; and
    a welding step of welding the ear portion of the insulating material to one end surface of the stator core.

11. The method of manufacturing the stator for an electric rotary machine according to claim 10, wherein
    the welding step includes cooling the ear portion by blowing compressed air after melting the ear portion.

* * * * *